(12) United States Patent
Juncker et al.

(10) Patent No.: US 12,223,037 B2
(45) Date of Patent: *Feb. 11, 2025

(54) SYSTEMS AND METHODS FOR CONTEXT-BASED MITIGATION OF COMPUTER SECURITY RISKS

(71) Applicant: Ivanti, Inc., South Jordan, UT (US)

(72) Inventors: Robert M. Juncker, Farmington, MN (US); Christopher J. Goettl, Owatonna, MN (US)

(73) Assignee: Ivanti, Inc., South Jordan, UT (US)

( * ) Notice: Subject to any disclaimer, the term of this patent is extended or adjusted under 35 U.S.C. 154(b) by 662 days.

This patent is subject to a terminal disclaimer.

(21) Appl. No.: 17/069,529

(22) Filed: Oct. 13, 2020

(65) Prior Publication Data

US 2021/0150023 A1 May 20, 2021

Related U.S. Application Data

(63) Continuation of application No. 15/906,559, filed on Feb. 27, 2018, now Pat. No. 10,805,333.

(Continued)

(51) Int. Cl.
*H04L 9/40* (2022.01)
*G06F 8/65* (2018.01)
(Continued)

(52) U.S. Cl.
CPC ............... *G06F 21/55* (2013.01); *G06F 8/65* (2013.01); *G06F 21/62* (2013.01); *H04L 63/101* (2013.01);

(Continued)

(58) Field of Classification Search
CPC .... G06F 21/60; G06F 21/62; G06F 2221/034; G06F 2221/2141; H04L 63/10;

(Continued)

(56) References Cited

U.S. PATENT DOCUMENTS 6,785,810 B1 * 8/2004 Lirov ...................... H04L 9/083
707/999.009
8,321,944 B1 * 11/2012 Mayer ................. H04L 63/1433
726/25

(Continued)

OTHER PUBLICATIONS

Federal Examination Report for Application No. 201917037863, dated Jan. 13, 2022, 5 pages.

*Primary Examiner* — Khang Do

(57) ABSTRACT

An apparatus includes a processor operatively coupled to a memory. The processor receives a first set of risk assessment rules including first user privilege criteria and first device criteria. The first device criteria include a computing device patch level, a network type, and/or a password policy. The processor identifies a user-specific security risk based on the first set of risk assessment rules and applies a privilege mitigation measure based on the user-specific security risk without being in communication with a management server. The processor later receives a second, updated set of risk assessment rules at the computing device. Upon detecting another login of the user, the processor identifies an updated user-specific security risk based on the updated set of risk assessment rules, and applies a modified privilege mitigation measure based on the updated user-specific security risk, again without being in communication with the management server.

16 Claims, 9 Drawing Sheets

Related U.S. Application Data

(60) Provisional application No. 62/464,152, filed on Feb. 27, 2017.

(51) Int. Cl.
　　*G06F 21/55*　　　(2013.01)
　　*G06F 21/62*　　　(2013.01)
　　*H04W 12/12*　　　(2021.01)
　　*H04W 12/126*　　(2021.01)
　　*H04W 12/128*　　(2021.01)

(52) U.S. Cl.
　　CPC ............ *H04L 63/104* (2013.01); *H04L 63/14* (2013.01); *H04L 63/1433* (2013.01); *H04L 63/1441* (2013.01); *H04L 63/20* (2013.01); *H04W 12/12* (2013.01); *H04W 12/126* (2021.01); *H04W 12/128* (2021.01); *G06F 2221/034* (2013.01); *G06F 2221/2141* (2013.01)

(58) Field of Classification Search
　　CPC ..... H04L 63/101; H04L 63/104; H04L 63/14; H04L 63/1433; H04L 63/1441; H04L 63/20
　　See application file for complete search history.

(56) References Cited

U.S. PATENT DOCUMENTS

| | | | |
|---|---|---|---|
| 8,539,546 B2* | 9/2013 | Kobayashi | G06Q 10/0635 726/1 |
| 9,185,136 B2* | 11/2015 | Dulkin | G06F 21/577 |
| 9,282,114 B1* | 3/2016 | Dotan | G06F 21/577 |
| 9,436,820 B1* | 9/2016 | Gleichauf | H04L 63/02 |
| 9,703,974 B1* | 7/2017 | Surkatty | H04L 63/20 |
| 9,798,883 B1* | 10/2017 | Gil | H04L 63/1433 |
| 9,830,469 B1* | 11/2017 | Anderson | G06F 21/44 |
| 9,843,934 B1* | 12/2017 | Jiang | H04W 12/12 |
| 10,404,733 B1* | 9/2019 | Shavell | H04L 63/1433 |
| 10,887,325 B1* | 1/2021 | Lin | G06N 20/00 |
| 2004/0078384 A1* | 4/2004 | Keir | H04L 41/12 707/999.102 |
| 2004/0181689 A1* | 9/2004 | Kiyoto | H04L 63/20 726/1 |
| 2006/0112007 A1* | 5/2006 | Hurwitz | G06Q 20/102 705/40 |
| 2007/0168311 A1* | 7/2007 | Genty | G06N 3/02 706/15 |
| 2008/0307525 A1* | 12/2008 | Nickle | G06Q 10/06 726/22 |
| 2009/0249448 A1* | 10/2009 | Choi | H04L 67/14 726/4 |
| 2010/0257580 A1 | 10/2010 | Zhao | |
| 2011/0016513 A1* | 1/2011 | Bailey, Jr. | G06F 21/602 709/224 |
| 2012/0192271 A1* | 7/2012 | Srivastava | G06F 21/554 726/22 |
| 2012/0210434 A1* | 8/2012 | Curtis | H04L 63/0263 726/25 |
| 2013/0031629 A1* | 1/2013 | Srivastava | G06F 21/554 726/22 |
| 2013/0067542 A1* | 3/2013 | Gonsalves | G06F 21/445 726/4 |
| 2013/0074182 A1* | 3/2013 | Ikeda | G06F 21/51 726/22 |
| 2013/0096980 A1* | 4/2013 | Basavapatna | G06Q 10/00 705/7.28 |
| 2014/0033321 A1* | 1/2014 | Patidar | G06F 21/6218 726/27 |
| 2014/0090071 A1* | 3/2014 | Salehie | G06F 21/55 726/25 |
| 2014/0109168 A1 | 4/2014 | Ashley et al. | |
| 2014/0359777 A1* | 12/2014 | Lam | G06F 21/577 726/25 |
| 2015/0319185 A1* | 11/2015 | Kirti | H04L 63/1416 726/23 |
| 2015/0334129 A1* | 11/2015 | Moyle | H04L 63/1425 726/1 |
| 2015/0339477 A1* | 11/2015 | Abrams | H04L 63/1416 726/23 |
| 2016/0026813 A1* | 1/2016 | Neitzel | G06F 21/604 726/17 |
| 2016/0112445 A1* | 4/2016 | Abramowitz | G06Q 40/08 726/23 |
| 2016/0226905 A1* | 8/2016 | Baikalov | H04L 63/1433 |
| 2016/0234229 A1* | 8/2016 | Carpenter | H04L 63/1433 |
| 2017/0070527 A1* | 3/2017 | Bailey | H04L 43/12 |
| 2017/0078315 A1* | 3/2017 | Allen | G06F 16/25 |
| 2017/0118223 A1* | 4/2017 | Mathew | G06F 21/31 |
| 2017/0169249 A1* | 6/2017 | de Oliveira | G06F 21/6245 |
| 2017/0208023 A1* | 7/2017 | Katayama | G06F 3/04842 |
| 2017/0251013 A1* | 8/2017 | Kirti | H04L 63/1441 |
| 2017/0272472 A1* | 9/2017 | Adhar | G06F 21/602 |
| 2017/0295197 A1* | 10/2017 | Parimi | H04L 63/10 |
| 2017/0318036 A1* | 11/2017 | Movsisyan | H04L 63/1425 |
| 2017/0346846 A1* | 11/2017 | Findlay | H04L 63/1433 |
| 2018/0026944 A1* | 1/2018 | Phillips | H04L 63/1433 726/4 |
| 2018/0027006 A1* | 1/2018 | Zimmermann | H04L 63/0227 726/11 |
| 2018/0041540 A1* | 2/2018 | Tas | H04L 63/10 |
| 2018/0091553 A1* | 3/2018 | Mandyam | H04L 63/1433 |
| 2018/0121665 A1* | 5/2018 | Anderson | G06F 21/6209 |
| 2018/0191766 A1* | 7/2018 | Holeman | H04L 63/20 |

* cited by examiner

SYSTEMS AND METHODS FOR CONTEXT-BASED MITIGATION OF COMPUTER SECURITY RISKS

CROSS-REFERENCE TO RELATED APPLICATIONS

This application is a continuation of U.S. patent application Ser. No. 15/906,559, filed Feb. 27, 2018, which claims the benefit of U.S. Provisional Patent Application No. 62/464,152, filed Feb. 27, 2017. These applications are incorporated herein by reference in their entireties.

TECHNICAL FIELD

The present disclosure generally relates to computers and computer-related technology. More specifically, the present disclosure relates to systems and methods for context-based mitigation of computer security risks.

BACKGROUND

The use of electronic devices has become increasingly prevalent in modern society. As the cost of electronic devices has declined, and as the usefulness of electronic devices has increased, people are using them for a wide variety of purposes. For example, many people use electronic devices to perform work tasks as well as to seek entertainment. One type of an electronic device is a computer.

Computer technologies continue to advance at a rapid pace. Computers commonly used include everything from hand-held computing devices to large multi-processor computer systems. These computers include software, such as applications including user interfaces, to make such computers useful and accessible to an end user. Computers are increasingly linked with other computers through networks. With the expansion of computer technology, the size of networks has continued to increase. Networks may link computers together that are a great distance apart.

One of the challenges involved with networks is providing computer security. For example, a malicious entity may attempt to breach a computing device to gain access to sensitive information on the computing device or its network. One way that a computing device may be compromised is by exploiting a user's privilege level. Users with elevated privilege levels may have more access to resources on a computing device or network.

Accordingly, a need exists for systems and methods for actively managing computer account usage and associated privilege levels to mitigate security risks.

SUMMARY

An apparatus includes a processor operatively coupled to a memory. The processor receives a first set of risk assessment rules including first user privilege criteria and first device criteria. The first device criteria include a computing device patch level, a network type, and/or a password policy. The processor identifies a user-specific security risk based on the first set of risk assessment rules and applies a privilege mitigation measure based on the user-specific security risk without being in communication with a management server. The processor later receives a second, updated set of risk assessment rules at the computing device. Upon detecting another login of the user, the processor identifies an updated user-specific security risk based on the updated set of risk assessment rules, and applies a modified privilege mitigation measure based on the updated user-specific security risk, again without being in communication with the management server.

DETAILED DESCRIPTION

Figure 1A:
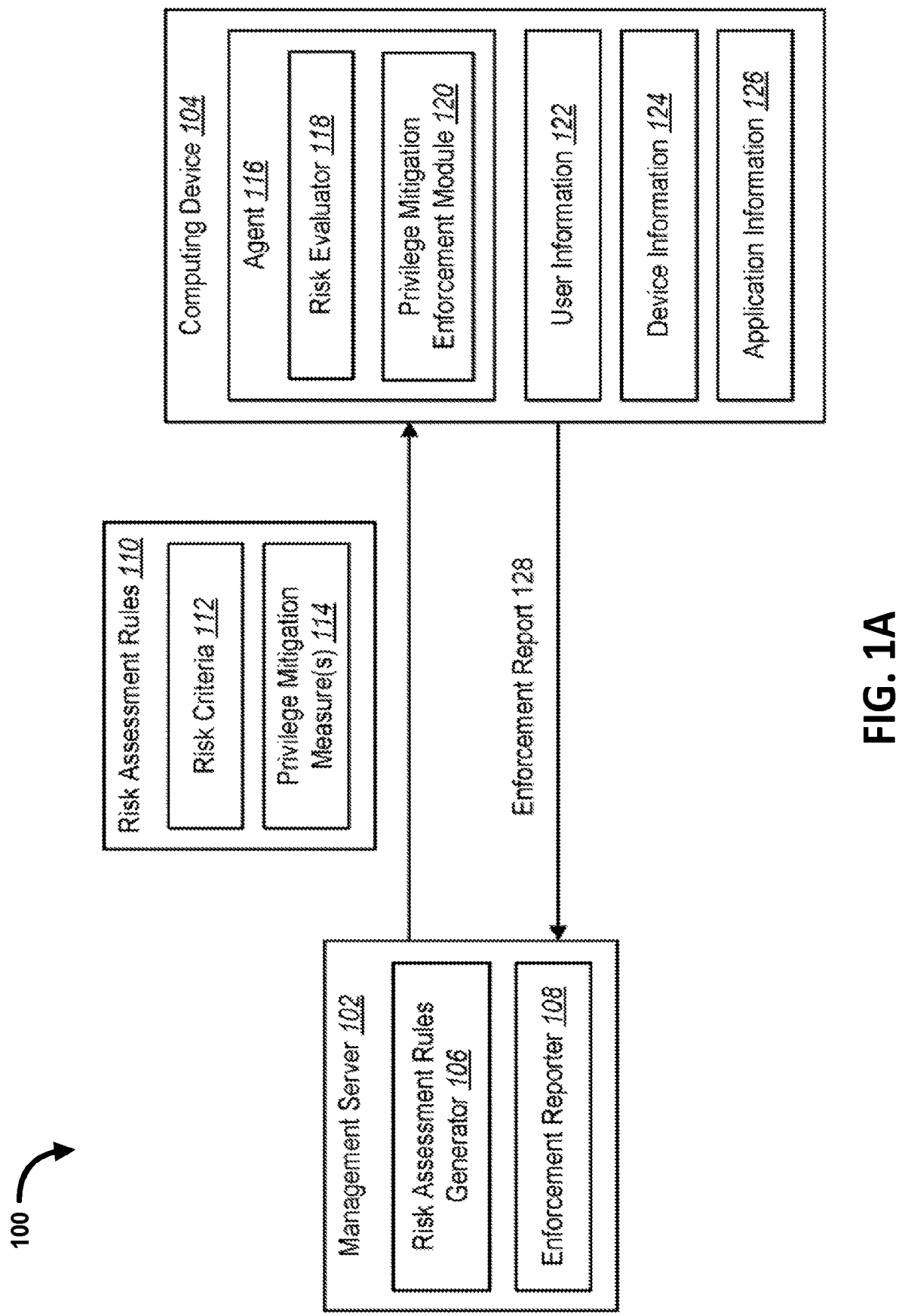
FIG. 1A is a block diagram illustrating a networked system for context-based privilege mitigation, according to an embodiment.

Methods and apparatuses of the present disclosure facilitate the management of computer system vulnerabilities on an individualized user basis. Changes to user permissions or privileges for a computing device can be determined and implemented dynamically ("on the fly") in response to detected changes to a context in which the user is using the computing device.

In some embodiments, an apparatus includes a processor that is operatively coupled to a memory and, in some embodiments, in operable communication with a network. The processor detects a first login event of a user of a computing device at a first time, and receives, in response to detecting the first login event, a first set of risk assessment rules at the computing device. The first set of risk assessment rules includes first user privilege criteria associated with the user, a set of privilege mitigation measures, and first device criteria. The first device criteria include at least one of a patch level of the computing device, a network type of the computing device, or a password policy. A first privilege mitigation measure from the set of privilege mitigation measures is associated with the first user privilege criteria. The processor identifies (e.g., in response to the first login event, in response to a detected group policy violation, in response to a detected change in the network, or in response to receiving the first set of risk assessment rules) a first user-specific security risk based on the first user privilege criteria and the first device criteria. The processor applies, via the computing device and at a second time, the first privilege mitigation measure from the set of privilege mitigation measures based on the first user-specific security risk, at a second time, at which when the processor is not in communication with a management server. The processor receives a second set of risk assessment rules at the computing device (e.g., in response to the detection of a new vulnerability associated with the computing device). The second set of risk assessment rules includes at least one of second user privilege criteria different from the first user privilege criteria or second device criteria different from the first device criteria. The processor detects, at a third time subsequent to the first time, a second login event of the user of the computing device. The processor identifies, based on the at least one of the second user privilege criteria or the second device criteria (and, for example, in response to the first login event, in response to a detected group policy violation, in response to a detected change in the network, or in response to receiving the first set of risk assessment rules), a second user-specific security risk different from the first user-specific security risk. The processor applies, via the computing device and at a fourth time (at which the processor is not in communication with the management server), a second privilege mitigation measure from the set of privilege mitigation measures. The second privilege mitigation measure is different from the first privilege mitigation measure and is based on the second user-specific security risk. The processor can be configured to report an enforcement activity to a management server after applying the first privilege mitigation measure and/or the second privilege mitigation measure.

The processor can apply the first privilege mitigation measure and/or the second privilege mitigation measure by repairing user account settings associated with the user to comply with a group policy. Alternatively or in addition, the processor can apply the first privilege mitigation measure and/or the second privilege mitigation measure by at least one of: (1) automatically repairing a group policy associated with the user; or (2) causing installation of an update on the computing device. Alternatively or in addition, the processor can apply the first privilege mitigation measure and/or the second privilege mitigation measure by at least one of patching, privilege management, whitelisting, or blacklisting.

In an example implementation, the processor identifies the first user-specific security risk further based on the first login event and the first login event includes a failed login attempt. In such an example implementation, the privilege mitigation measure includes locking-out the user from an application running on the computing device (e.g., preventing the user from accessing an application running on the computing device). In some other implementations, when the first device criteria include the network type of the computing device, the first privilege mitigation measure can include disabling network access for the user if the network type of the computing device is a public network. In still other implementations, when the first device criteria includes the network type of the computing device, the first privilege mitigation measure can include sending an alert (e.g., advising the user that the network is public) to the user if the network type of the computing device is a public network [0021] In a further example implementation, the processor is configured to identify the user-specific security risk by detecting a user privilege level of the user of the computing device, and detecting, based on the risk assessment rules, a vulnerable software application to which the user has access. The processor is configured to apply the privilege mitigation measure by at least one of modifying the user privilege level of the user, disallowing software from being installed on the computing device until an update to the vulnerable software application is installed, or disallowing the vulnerable software application from running until a security fix has been applied to the computing device.

In a further example implementation, the processor is configured to identify the user-specific security risk by detecting that the user has access to a security-sensitive file, and detecting that the computing device is on a public network. The processor is configured to apply the privilege mitigation measure by at least one of disallowing access to the security-sensitive file, disabling network access for the computing device until the computing device is not connected to a public network, or disabling the computing device. In still other implementations, the processor is configured to identify the user-specific security risk by detecting a user privilege level of the user of the computing device and detecting that one or more user account settings associated with the user violate a group policy. In some instances, the processor is configured to detect, based on the first user privilege criteria, that the user has access to a security-sensitive file. In such instances, the first device criteria can include that the network type of the computing device is a public network and the first privilege mitigation measure can include disallowing access, by the user, to the security-sensitive file.

In some embodiments, an apparatus includes a processor and a memory operatively coupled to the processor. The processor is configured to detect a first login of a user on a computing device at a first time, and receive a first set of risk assessment rules including user privilege criteria associated with the user of the computing device. The user privilege criteria can include a user privilege level for the user. The processor then detects, in response to detecting the first login, and based on the first set of risk assessment rules, a vulnerable software application to which a user has access. The processor reduces the user privilege level (e.g., provides restricted access to the login user such that the login user has access to fewer capabilities/resources, removes access to one or more capabilities/resources associated with an identified risk, etc.) in response to detecting the vulnerable software application. The processor later receives a second set of risk assessment rules associated with the user of the computing device. At a third time after the second time, a second login of the user is detected on the computing device, and the processor raises and/or elevates the user privilege level (e.g., provides increased access to the login user such that the login user has access to more capabilities/resources, grants access to one or more capabilities/resources associated with an identified risk, etc.) in response to detecting the second login and based on the second set of risk assessment rules.

In some implementations, the processor is further configured to detect that a patch has been installed on the computing device. The patch can be associated with the vulnerable software application. Raising the user privilege level can be further based on detecting the patch. In still other implementation, the processor is further configured to detect, based on the first user privilege criteria, that one or more user account settings associated with the user violate a group policy. The first privilege mitigation measure can include repairing the one or more user account settings associated with the user to comply with the group policy.

In some embodiments, a method includes detecting, by a processor in operable communication with a network, and at a first time, a first login event of a user of a computing device. At the processor and in response to detecting the first login of the user, a first set of risk assessment rules is identified. The first set of risk assessment rules can include: (1) first user privilege criteria associated with the user; (2) a set of privilege mitigation measures; and (3) first application criteria. The first application criteria include at least one of a vendor of a software application running on the computing device, a version of the software application, a patch level of the software application, or a risk of exposure for the software application. At least one privilege mitigation measure from the set of privilege mitigation measures is associated with the first user privilege criteria. A first user-specific security risk is identified, via the processor, based on the first user privilege criteria and the first application criteria. A first privilege mitigation measure from the set of privilege mitigation measures is applied, via the computing device and at a second time, based on the first user-specific security risk. The processor is not in communication with a management server at the second time. A second set of risk assessment rules is identified by the processor. The second set of risk assessment rules includes at least one of a second user privilege criteria different from the first user privilege criteria or a second application criteria different from the first application criteria. A second login event of the user of the computing device is detected, via the processor and at a third time subsequent to the first time. A second user-specific security risk that is different from the first user-specific security risk and based on the at least one of the second user privilege criteria or the second application criteria is identified, via the processor. A second privilege mitigation measure from the set of privilege mitigation measures is then applied, via the computing device and at a fourth time. The second privilege mitigation measure is different from the first privilege mitigation measure and is based on the second user-specific security risk. The processor is not in communication with the management server at the fourth time. At least one of the first privilege mitigation measure and the second privilege mitigation measure includes sending an alert to the user. The alert can include a message recommending a software update and/or a message initiating an update to the software application.

Various configurations of the systems and methods for context-based privilege mitigation are now described with reference to the figures, where like reference numbers may indicate identical or functionally similar elements. The configurations of the present systems and methods, as generally described and illustrated in the figures herein, could be arranged and designed in a wide variety of different configurations. Thus, the following more detailed description of several configurations, as represented in the figures, is not intended to limit the scope of the systems and methods, but is merely representative of the various configurations of the systems and methods.

FIG. 1A is a block diagram illustrating a networked system 100 for context-based privilege mitigation, according to an embodiment. The networked system 100 includes a set of electronic devices that are in electronic communication with one another via a network (not shown in FIG. 1A). For example, the networked system 100 may include one or more Local Area Networks (LANs), Wide Area Networks (WANs), Wireless Local Area Networks (WLANs), the Internet, etc. The networked system 100 includes one or more computing devices 104 and at least one management server 102.

Each of the management server 102 and the computing device 104 can be, for example, a hardware based integrated circuit (IC) or any other suitable processor/processing device configured to run and/or execute a set of instructions or code. For example, the management server 102 and/or the computing device 104 can be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. Each of the management server 102 and/or the computing device 104 can be operatively coupled to a memory through a system bus (for example, address bus, data bus and/or control bus).

The management server 102 can include a risk assessment rules generator 106 and an enforcement reporter 108. The computing device 104 can include an agent 116 that has a risk evaluator 118 and a privilege mitigation enforcement module 120. Each of the risk assessment rules generator 106, the enforcement reporter 108, the agent 116, the risk evaluator 118, and/or the privilege mitigation enforcement module 120 can be software stored in memory and executed by a processor (e.g., code to cause the processor to execute the risk assessment rules generator 106, the enforcement reporter 108, the agent 116, the risk evaluator 118, and/or the privilege mitigation enforcement module 120 can be stored in the memory) and/or a hardware-based device such as, for example, an ASIC, an FPGA, a CPLD, a PLA, a PLC and/or the like. Software (executed on hardware) can be expressed in a variety of software languages (e.g., computer code), including C, C++, Java™, Ruby, Visual Basic™, and/or other object-oriented, procedural, or other programming language and development tools.

The management server 102 can include a processor and a memory, and can communicate with the one or more computing devices 104 of the networked system 100 via the network. The management server 102 may be physically located in a location that is geographically remote from the one or more computing devices 104. In an implementation, the management server 102 is a cloud-based server that is accessible, for example, via an Internet connection. Alternatively, the management server 102 may also be physically co-located with the one or more computing devices 104.

Depending on the implementation, the one or more computing devices 104 can include a server, a desktop computer, a laptop computer, a tablet computer, a smartphone, a router, a printer, etc. In an implementation, the one or more computing devices 104 is a mobile device (e.g., laptop computer, smartphone, tablet computer, etc.) that is configured to join multiple different networks.

Computer security is important to protect the one or more computing devices 104 and the network to which the one or more computing devices 104 and the management server 102 are connected. Computer security may also be referred to as "cyber security" or information technology (IT) security. Computer security includes controlling access to the hardware and software of the one or more computing devices 104. Computer security also includes protecting a network against harm that may come via vulnerabilities in network access, data and code (e.g., compromised software applications).

Computer security is becoming increasingly important as more and more computing devices 104 are connected over one or more networks. For example, as society comes to rely on sophisticated computing systems and the Internet, computing devices 104 may be exploited by malicious entities to compromise privileged information. This problem is especially important with the use of wireless networks (e.g., Bluetooth®, Wi-Fi®, cellular) and the growth of "smart" devices (e.g., smartphones, televisions and devices that are part of the Internet of Things).

A computing device 104 may face various vulnerabilities. For example, a software application that is installed on a computing device 104 may become susceptible to a zero-day exploit that allows hackers to exploit computer programs and/or data on the computing device 104, additional computers and/or a network. Another vulnerability that a computing device 104 faces is moving from a secure network to a public network that does not provide a secure environment. For example, a hacker may monitor network traffic on a public network in an attempt to gain access to a computing device 104. Yet another vulnerability that a computing device 104 faces is a compromised user account. For example, a hacker may attempt to gain access to a computing device 104 or network by acquiring user credentials (e.g., username and password). This scenario is particularly dangerous for a user that has elevated privileges on the computing device 104. For example, an administrator may have elevated privileges to access more files, applications or network resources than a non-administrator user on a network. A hacker could therefore cause considerable damage to a network with an administrator's user credentials.

Different approaches may be used to provide computer security. One approach is to install anti-virus software. Anti-virus software typically uses a detection routine that notifies users and administrators when a computing device 104 has been compromised by malicious software. The anti-virus software can also detect a malicious code signature or behavior during a scan of the computing device 104. The anti-virus approach, however, is generally applied after-the-fact in relation to the security issue. In other words, anti-virus software typically detect a compromised computing device 104 after the computing device 104 has been infected. As such, anti-virus software generally responds to known threats, but does nothing to protect a computing device 104 against threats that are not yet known.

Another approach to computer security is patch management. In patch management, software programs on a computing device 104 are generally updated as updates are made available. With a patch management system, however, the updates may not be applied quickly enough to secure the computing device 104 against newly-discovered vulnerabilities. For example, in the case of a zero-day exploit, a computing device 104 that is running a compromised software application may remain vulnerable until an associated patch is made available and installed.

Yet another approach to computer security uses a group policy object (GPO). IT administrators may create and/or define GPOs to enforce the rules of the network 100. Administrators typically create and/or define the policies that govern the rules and rights of users on a network. For example, the GPO may specify password expiration parameters and password complexity rules. Because the administrators, however, are the ones who create the GPOs and/or have access to the GPOs, the administrators can override the GPO settings at a user level without having the override flagged by GPO exceptions. In other words, these administrators have rights that allow the administrators to avoid being subject to the GPO. Furthermore, administrators typically perform annual security compliance validations, however, due to the complexity of IT environments, the security compliance validations are often spot-checks, as opposed to full audits of compliance, and any desired GPO overrides may not be implemented.

Within computer security, common exploits typically result in a malicious user gaining access to a user's account and whatever privileges or rights that user has. Users with elevated rights and roles (e.g., administrators) should, therefore, have more security policies applied to such users than other users (e.g., non-administrators) to ensure that if an account of a user with elevated rights and/or roles is targeted, malicious users would not be able to gain access to critical parts of the network (e.g., of a corporate network). This is, however, rarely followed in practice. For example, IT administrators may disable the password expiration parameters and password complexity rules that they enforce with respect to other users, often for reasons of convenience, but at the cost of decreased security for the broader IT environment (e.g., a corporate IT environment).

As can be observed by the foregoing, a need exists for context-based privilege mitigation to protect a computing device 104. Systems and methods described herein (e.g., the networked system 100) can analyze relevant content pertaining to a user that is logged into the computing device 104 (also referred to herein as a login user), e.g., including settings, policies, and/or the software applications and/or computing devices to which the login user has access, to determine an appropriate level of security for the login user. The networked system 100 can then apply a privilege mitigation measure to reduce a security risk. With privilege mitigation, even without a detected malicious signature, the networked system 100 can help to secure a computing device 104 against known and unknown threats.

Systems and methods described herein (e.g., the networked system 100) help to ensure that security of a computing system is adequate for a given the situation or context. In some embodiments, the context associated with a computing device 104 is analyzed to determine whether a privilege mitigation measure 114 should be applied. The context may include information about the computing device 104 (e.g., device settings, software applications authorized to be installed on the computing device (i.e., "whitelisted" software applications), predefined or desired patch levels for software applications of the computing device, etc.), the login user (e.g., the user account used to log into the computing device 104, privilege/permission level(s) associated with the user, etc.), and a network type (e.g., private/"on-network" or public/"off-network") of a network to which the computing device 104 is connected when the user logs in or during a period of time in which the user is using the computing device 104. Based on a current state of the computing device 104 and a current state of known vulnerabilities, the privileges and/or settings applicable to the login user can be restricted such that the computing device 104 is safer.

The management server 102 can be a device at which an administrator creates, defines, views and manages policies and/or rule sets that the administrator want to enforce for the networked system 100. The administrator may make dynamic rule sets, static rule sets, or a combination of both.

In an example implementation, the management server 102 is used to generate risk assessment rules 110, for example using a risk assessment rules generator 106 residing within the management server 102 (e.g., stored in a memory of the management server 102 and/or executed by a processor of the management server 102). An administrator may define the risk assessment rules 110 that apply to the one or more computing devices 104 in the networked system 100. The risk assessment rules 110 can include risk criteria 112 and one or more privilege mitigation measures 114 associated with the risk criteria 112. The risk criteria 112 provide context with which a computing device 104 can assess one or more risks associated with a login user. The risk criteria 112 can include, for example, user privilege criteria, device criteria, and/or application criteria that may be applicable to identification of a security risk. The user privilege criteria can include parameters associated with the login user that indicate a security risk. For example, the user privilege criteria can include an indication of whether the login user is an administrator or not. The user privilege criteria can also include an indication of whether the login user has elevated privileges regarding access to resources on the computing device 104 and/or the network. The user privilege criteria can also include an indication of whether the login user has network privileges beyond the privilege to access the network (e.g., privileges for modifying data on one or more networked devices, installing software applications on networked devices, etc.).

Device criteria can include parameters associated with the computing device 104 that may be applicable to the identification of a security risk. These parameters can include, for example, an indication of a patch level (e.g., a number of software patches that have been applied, or an identifier/version number of a software patch) of the computing device 104, an indication of a network "type" or location (e.g., on a designated secure network or on a public network), one or more password policies (e.g., GPO policies), and/or an indicator of a type of the computing device 104 (e.g., laptop or smartphone, make, model, etc.).

The application criteria can include parameters associated with a software application installed on the computing device 104 that may be applicable to the identification of a security risk. The application criteria can include, for example, an indication of a vendor of an application, a version of the application, an indication of a patch level of the application, an indication of a risk of exposure for that application, and/or indications of one or more known vulnerabilities.

The risk assessment rules 110 can also include a collection of indicators of one or more privilege mitigation measures 114 associated with the risk criteria 112. In some instances, a privilege mitigation measure 114 is one or more actions related to user privilege that can be implemented by the computing device 104 to decrease an identified risk associated with a login user. One or more privilege mitigation measures 114 can be mapped to a security risk that is identified based on the risk criteria 112. The implementation of one or more privilege mitigation measures 114 at the computing device can be applied at the management server 102 by sending a signal from the management server 102 to the computing device 104. The signal can encode an instruction to implement the one or more privilege mitigation measures 114 at the computing device. Alternatively, the implementation of the one or more privilege mitigation measures 114 at the computing device can be applied directly/locally at the computing device.

An example of a privilege mitigation measure 114 includes reducing a user privilege level of the login user (e.g., providing restricted access to the login user such that the login user has access to fewer capabilities/resources, removing access to one or more capabilities/resources associated with an identified risk, etc.). For example, a privilege level for an administrator that is found to have an associated security risk of "high" may be reduced. Another example of a privilege mitigation measure 114 includes disabling software application installation (e.g., generally or for one or more specific software applications) and/or disabling software application use on the computing device 104 until a software application installed on the computing device and identified as being "vulnerable" is updated. Other examples of privilege mitigation measures 114 include preventing access to privileged and/or confidential files, disabling network access, prompting a user to resolve an identified security risk, and/or disabling the computing device 104.

In an implementation, the selection of one or more privilege mitigation measures 114 is based on a network type/location. For example, a first privilege mitigation measure 114 may be implemented at the computing device 104 (e.g., in response to a signal received at the computing device 104 from the management server 102, and encoding an instruction to implement the one or more privilege mitigation measures 114 at the computing device) when the computing device 104 is identified as being connected to a designated safe network (e.g., a home network or other private network), while a second privilege mitigation measure 114 different from the first privilege mitigation measure 114 may be implemented at the computing device 104 if the computing device 104 is identified as being connected to a public network.

In some implementations, the privilege mitigation measures 114 are selected based on a severity of a known vulnerability. The severity can be determined at the computing device 104 or at the management server 102. For example, a software application installed on the computing device 104 can be identified as being out of date or in need of an update (and therefore potentially vulnerable to one or more security risks), and the networked system 100 can further identify that a scheduled update of the software application is being delayed another week until a maintenance "window" (i.e., time interval) associated with the computing device 104 commences. In such a case, a first privilege mitigation measure 114 can include prompting the user to manually update the computing device 104, without any other restrictions. As another example, however, the software application may become susceptible to a known exploit (i.e., security vulnerability). In this case, a software application update can be identified as critical, and a second privilege mitigation measure 114 may be implemented to prevent access to the software application until the software application update is installed.

In some implementations, the risk assessment rules 110 include a decision tree that a computing device 104 follows to reduce an identified security risk associated with a login user and/or with the computing device 104. The risk assessment rules 110 can be associated with indications of multiple different scenarios in which the computing device 104 can take remedial action, giving an administrator the ability to define different levels of reaction (i.e., privilege mitigation) for the computing device 104, depending, for example, on the risk associated with a given scenario.

In some implementations, the management server 102 sends the risk assessment rules 110 (including the risk criteria 112 and the indicators of privilege mitigation measures 114) to the computing device 104. As shown in FIG. IA, the computing device 104 can include an agent 116 configured to perform context-based privilege mitigation using the risk assessment rules 110. The agent 116 can be part of or associated with a network management system that is used to manage the computing device 104.

The agent 116 of FIG. IA includes a risk evaluator 118 configured to determine a security risk associated with a login user of the computing device 104 (i.e., a user-specific security risk) based on the risk assessment rules 110. For example, the risk evaluator 118 can determine the security risk based on user information 122, device information 124 and/or application information 126 associated with the computing device 104, in addition to the risk criteria 112 in the risk assessment rules 110. When the risk evaluator 118 determines the security risk based on the user information 122, the agent 116 can determine which users have privileges that are in need of mitigation, and audit one or more policies associated with those users to ensure that the appropriate policies are being enforced.

In an implementation, the risk evaluator 118 identifies a security risk associated with the login user upon and/or after detection of a login of the computing device 104. For example, before a user logs in (i.e., at a time when the user is not logged in on that computing device 104), the computing device 104 may not identify any security risk. Once a user logs in, however, the computing device 104 may apply the risk assessment rules 110 (e.g., based on an identifier of the login user and/or an identifier of a software application installed and/or running on the computing device 104) to determine a security risk associated with the login user.

In another implementation, the risk evaluator 118 determines a security risk associated with the login user upon receiving updated risk assessment rules 110 from the management server 102, and that indicate that a new security vulnerability is associated with the computing device 104. In such an implementation, a user may be currently logged in. For example, in the case of a zero-day exploit, new risk assessment rules 110 may be sent from the management server 102 to the computing device 104, and may identify this new vulnerability. In this case, the new risk assessment rules 110 may flag the newly discovered vulnerability and prompt the implementation, at the computing device 104, of one or more privilege mitigation measures 114 of the risk assessment rules 110.

In some implementations, the risk evaluator 118 reevaluates the risk assessment rules 110 to update the security risk associated with a login user periodically and/or in response to a detected event. For example, the risk evaluator 118 may reevaluate the risk assessment rules 110 whenever a user logs into the computing device 104. Alternatively, the risk evaluator 118 may reevaluate the risk assessment rules 110 for a login user once per day (or another configurable time period). The risk evaluator 118 may also reevaluate the risk assessment rules 110 whenever new risk assessment rules 110 are received at the computing device 104 from the management server 102, and/or when a critically-flagged item is identified in the new risk assessment rules 110.

The agent 116 can also include a privilege mitigation enforcement module 120 specifying one or more privilege mitigation measures 114 for implementation by a processor on the computing device 104 based on a detected security risk associated with the login user. When the security risk is detected, the privilege mitigation enforcement module 120 may prevent the user from accessing one or more resources of the computing device 104 (e.g., one or more software applications), so as to protect the computing device 104. The one or more privilege mitigation measures 114 enforced by the privilege mitigation enforcement module 120 can be specified by the risk assessment rules 110.

In an implementation, the privilege mitigation enforcement module 120 enforces a privilege mitigation measure 114 including one or more of software patching, privilege management, and/or whitelisting/blacklisting. When the privilege mitigation measure 114 includes software patching, the privilege mitigation enforcement module 120 may provide an indication (e.g., via a graphical user interface, "GUI") to the user that a software update is available. The privilege mitigation enforcement module 120 can cause the update to be installed, either automatically or in response to a user input (e.g., via the GUI).

When the privilege mitigation measure 114 includes privilege management, a privilege level associated with the user account may be reduced. For example, an administrator or other login user having one or more elevated privilege levels associated with his/her account (as compared with one or more other users) may have one or more of their user privilege levels reduced, for example to limit their access to files, applications or other resources on the computing device 104 and/or accessible via the network.

When the privilege mitigation measure 114 includes whitelisting, the privilege mitigation enforcement module 120 may permit one or more functions/resources on the computing device 104 to permit continued operation/accessibility of the one or more functions/resources. When the privilege mitigation measure 114 includes blacklisting, one or more functions/resources may be disabled. In an example, the risk evaluator 118 may determine that a software application installed on the computing device 104 is out-of-date, and that a current version of the software application is vulnerable to exploitation. Based on such a determination, the privilege mitigation enforcement module 120 may "blacklist" (e.g., make unavailable for use) a predetermined set of software applications until one or more software applications of the set is updated, while otherwise permitting continued operation of the computing device 104. Alternatively, the privilege mitigation enforcement module 120 may "whitelist" (e.g., make available for use) a predetermined set of software applications until one or more software applications not within the set is updated (at which point, the updated software application(s) may be added to the whitelist). The privilege mitigation enforcement module 120 may also blacklist the vulnerable software application, thereby disabling the software application until is the software application's version is updated. Although whitelist and blacklist options can impact a user's experience (e.g., providing temporary inconvenience to the user when using the computing device 104), such approaches can be useful for protecting the computing device 104 until the risk is resolved.

In some implementations, the agent 116 is configured to be self-contained, in that if the agent 116 is off-network (i.e., not in communication with a management server 102), the agent 116 can still enforce risk assessment rules 110. Similarly stated, the risk assessment rules 110 can be stored in a local memory of the computing device 104 once received, and subsequently accessed/used by the agent 116. For example, the computing device 104 can be configured to "receive" (or identify) the risk assessment rules 110 from the local memory.

As used herein, "on-network" refers to the computing device 104 being connected to a designated safe network, and "off-network" refers to the computing device 104 not being connected to a designated safe network. For example, if the computing device 104 is in an office, the computing device 104 may communicate with a domain controller on the network to determine that it is on a designated safe network. The computing device 104 can, for example, detect a core infrastructure associated with a designated safe network, and as a result, determine that the computing device 104 is connected to the designated safe network.

If the computing device 104 is not on a designated safe network, but still able to access the internet, the computing device 104 may be referred to as being off network. For example, the computing device 104 may be in an internet cafe, on a hotel WiFi®, on a home WiFi®, etc. If the computing device 104 does not detect any of the core infrastructure indicative of an on-network connection (thus, determining that the computing device 104 is off-network), the agent 116 may make a security decision that is different from a security decision that it would make if the agent 116 did detect the core infrastructure indicative of an on-network connection. For example, upon determining that the computing device 104 is off-network, the agent 116 may implement a larger number of privilege mitigation measures 114 than the agent 116 would implement upon determining that the computing device 104 is on-network.

In some implementations, the computing device 104 is configured to identify a security risk based on a login event such as a failed login attempt (or a number of failed login attempts exceeding a predetermined or predefined threshold number). In response to identifying the security risk based on the failed login attempt, the computing device 104 can implement a privilege mitigation measure of locking out the user from an application running on the computing device 104.

The agent 116 can also be configured to acquire risk assessment rules 110 when the computing device 104 is at a remote network location. For example, in a cloud-based approach, if the computing device 104 is on a public network, the agent 116 may contact the management server 102 via the Internet to acquire the risk assessment rules 110. Therefore, a computing device 104 that is off-network can still be supported as if it were on-network.

In an implementation, the agent 116 is configured to report enforcement activity (i.e., privilege mitigation measures that have been implemented) back to the management server 102 after the privilege mitigation measures have been implemented. When the agent 116 identifies a security risk and enforces a privilege mitigation measure 114, the agent 116 may send an enforcement report 128 back to the management server 102. Upon receiving the enforcement report 128, an enforcement reporter 108 of the management server 102 may provide a notification (e.g., via a GUI of the management server 102) to an administrator. The enforcement report 128 may alert the administrator about a change in best practices. For example, the enforcement report 128 may prompt the administrator to limit interactive sessions.

In some implementations, a security risk can be reduced using privilege mitigation when a vulnerable software application is identified. For example, an administrator may become aware of an exploit of a software application that is "in the wild." An "in the wild" software application is a software application that is in use and has been released outside a confined environment (e.g., is propagating through an infected network). Based on knowledge of the exploit, the administrator may generate new risk assessment rules 110 for the associated software application. These new risk assessment rules 110 may be sent to a computing device 104 via the network. The agent 116 on the computing device 104 may then monitor updates that are available for the associated software application, in response to receiving the new risk assessment rules 110.

Upon receiving the new risk assessment rules 110, which include an indication that the vulnerable software application is a security risk, the agent 116 may determine that the vulnerable software application is on the computing device 104, and in response to the determination, apply a privilege mitigation measure 114. The privilege mitigation measure 114 may include reducing a privilege level of a login user associated with the vulnerable software application until the vulnerable software application is fully up-to-date (i.e., until an update has been made to the vulnerable software application that renders the software application no longer vulnerable to the identified security threat). The agent 116 may also implement one or more additional privilege mitigation measures 114 to further protect the login user and/or the computing device 104. For example, the agent 116 may implement a dynamic policy assignment process in which a security policy associated with a login user is modified iteratively (e.g., periodically and/or in response to a trigger) depending on a set of circumstances associated with the login user at the time of the modification of the security policy.

In some such instances, a further set of risk assessment rules 110 associated with the software application and/or login user may be received at a later time. For example, the further set of risk assessment rules 110 can include an indication that a software patch has been applied, and/or an indication that a new software vulnerability has been identified). Subsequently, a further login of the user on the computing device 104 may be detected. In response to detecting the further login and based on the further set of risk assessment rules 110, the user privilege level may be raised (or otherwise adjusted).

In some implementations, a security risk can be reduced using privilege mitigation by automatically repairing a group policy. For example, the agent 116 may analyze relevant content (e.g., settings, policies, etc.) pertaining to the user and/or the software applications or devices to which the user has access, to determine an appropriate level of security for the user. The agent 116 may determine that user account settings associated with the login user violate a group policy object (GPO) in some manner. For example, an administrator may override a password enforcement policy. In this case, the privilege mitigation measure 114 may be to repair the user account settings of the login user to comply with the GPO. Alternatively or in addition, the agent 116 may enforce the GPO through rules and/or through the monitoring of the validity of actions constituting policy exceptions, and by applying the rules or, in response to the monitoring, modify (or "repair") the GPO to ensure that users are acting responsibly.

Systems and methods described herein (e.g., system 100 of FIG. IA) improve upon known approaches to computer security. Instead of responding after-the-fact to a security risk, the described systems and methods provide computer security through context-based privilege mitigation to secure a computing device 104 against known and unknown threats. Different actions may be taken to reduce one or more security risks associated with the login user, as opposed to reducing one or more security risks associated with the computing device 104.

Figure 1B:
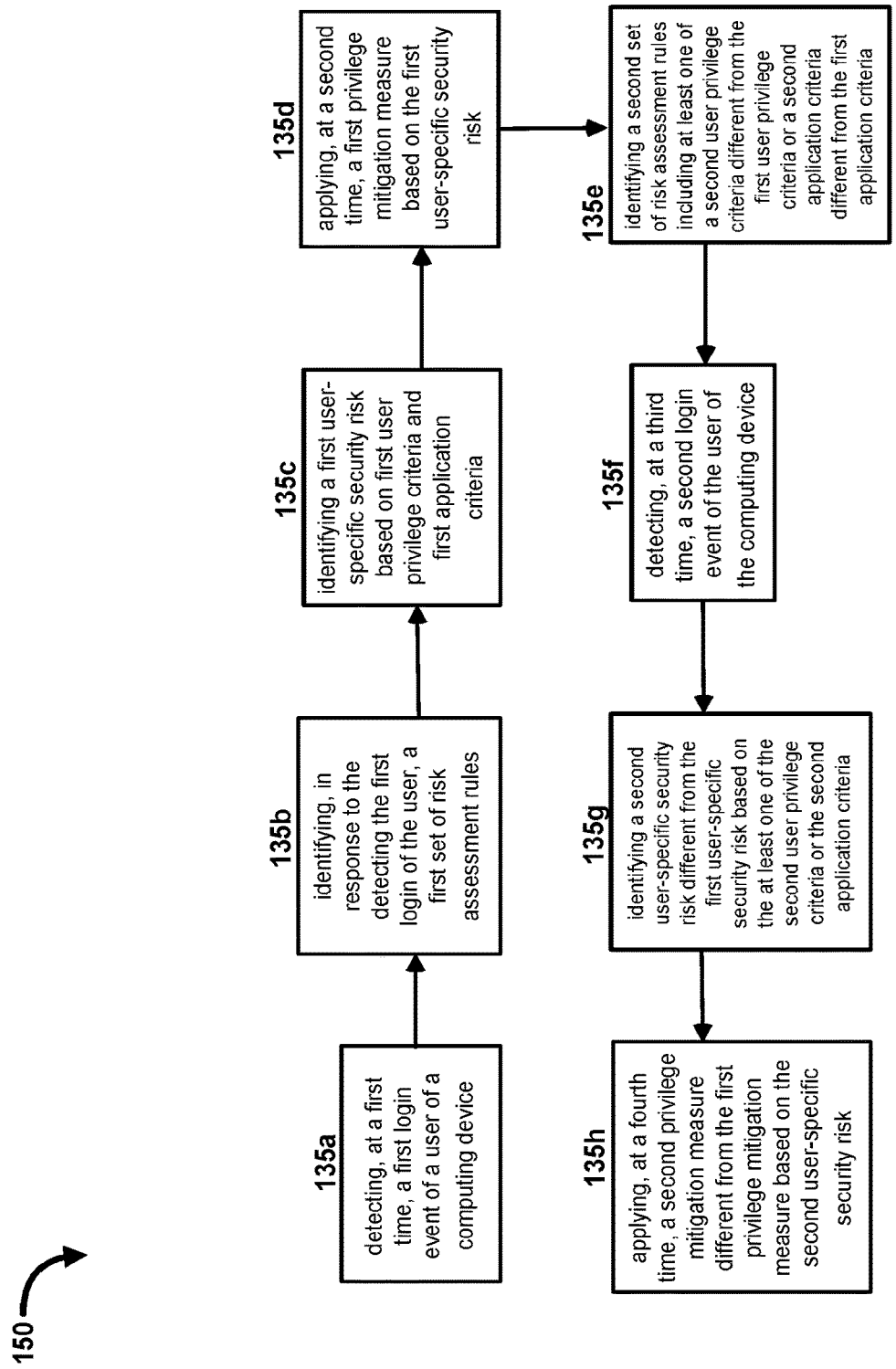
FIG. 1B is a flow diagram illustrating a method for context-based privilege mitigation, according to an embodiment.

FIG. 1B is a process flow diagram illustrating a processor-implemented method for context-based privilege mitigation, implementable by a processor of computing device 104 in FIG. 1, according to an embodiment. As shown in FIG. 1B, a method 150 for context-based privilege mitigation includes detecting, at 135*a*, by a processor in operable communication with a network, and at a first time, a first login event of a user of a computing device. At the processor and in response to the detecting the first login of the user, a first set of risk assessment rules is identified, at 135*b*. In some instances, the first set of risk assessment rules can include: (1) first user privilege criteria associated with the user; (2) a set of privilege mitigation measures; and (3) first application criteria. The first application criteria include at least one of a vendor of a software application running on the computing device, a version of the software application, a patch level of the software application, or a risk of exposure for the software application. At least one privilege mitigation measure from the set of privilege mitigation measures can be associated with the first user privilege criteria.

At 135c, a first user-specific security risk is identified, via the processor, based on the first user privilege criteria and the first application criteria (e.g., received from a management server via risk assessment rules, as shown in FIG. IA). A first privilege mitigation measure from the plurality of privilege mitigation measures is then applied, at 135d, via the processor and at a second time, based on the first user-specific security risk. In some implementations, the processor is not in communication with a management server at the second time. In other implementations, the processor is in communication with the management server at the second time.

A second set of risk assessment rules is identified by the processor, at 135e. The second set of risk assessment rules can include at least one of a second user privilege criteria different from the first user privilege criteria or a second application criteria different from the first application criteria, for example because the computing context has changed. A second login event of the user of the computing device is detected, via the processor and at a third time subsequent to the first time, at 135f. A second user-specific security risk that is different from the first user-specific security risk and based on the at least one of the second user privilege criteria or the second application criteria is identified, via the processor, at 135g. A second privilege mitigation measure from the set of privilege mitigation measures is then applied, via the processor and at a fourth time, at 135h. The second privilege mitigation measure is different from the first privilege mitigation measure and is based on the second user-specific security risk. The processor is not in communication with the management server at the fourth time. At least one of the first privilege mitigation measure and the second privilege mitigation measure includes sending an alert to the user. The alert can include a message recommending a software update and/or a message initiating an update to the software application.

Figure 2:
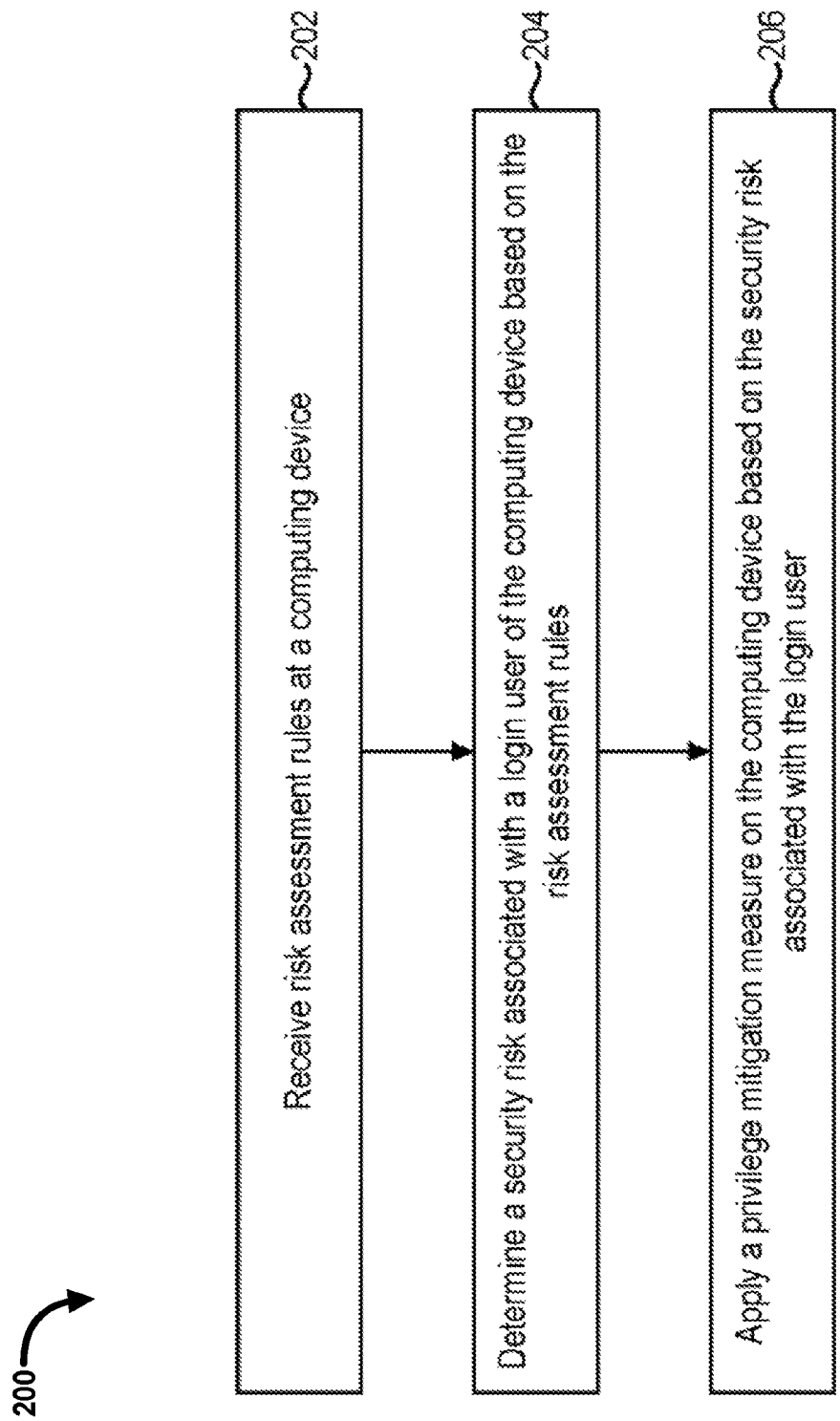
FIG. 2 is a flow diagram illustrating a method for context-based privilege mitigation, according to another embodiment.

FIG. 2 is a flow diagram illustrating a method 200 for context-based privilege mitigation, according to another embodiment. The method 200 may be implemented by a computing device (e.g., computing device 104 of FIG. IA). The computing device may be in communication with a management server (e.g., management server 102 of FIG. IA) via a network. As shown in FIG. 2, the computing device 104 can receive, at 202, risk assessment rules 110 from the management server 102. The risk assessment rules 110 may include risk criteria 112 that include an indication of a security risk. These risk criteria 112 may include user privilege criteria, device criteria or application criteria that indicate a security risk. For example, the user privilege criteria may indicate that when the login user is an administrator, a security risk is "high" (as compared with a security risk associated with a non-administrator login user). In another example, the device criteria may include a network type/location of the computing device 104, and a public network may be associated with a higher security risk than that of a designated safe network (e.g., a private network). In yet another example, application criteria include indicators of one or more known vulnerabilities to which a software application may be exposed. The risk assessment rules 110 may also include one or more privilege mitigation measures 114 associated with a security risk. A privilege mitigation measure 114 includes one or more actions that can be implemented by the computing device 104 to decrease the identified security risk associated with a login user.

The computing device 104 may determine, at 204, a security risk associated with a login user of the computing device 104 based on the risk assessment rules 110. The computing device 104 may determine 204 a security risk based on user information 122, device information 124 and/or application information 126 associated with the computing device 104, in addition to the risk criteria 112 in the risk assessment rules 110 (collectively, "contextual information"). If the evaluated contextual information is determined to be associated with one or more risk criteria 112, a security risk is identified. For example, if the login user is an administrator with access to privileged or sensitive data and the computing device 104 is connected to a public network, the computing device 104 may determine that a security risk is present.

In an implementation, the computing device 104 may determine, at 204, the security risk associated with the login user upon detection of a login by the login user at the computing device 104. For example, when a user logs into the computing device 104, the computing device 104 may evaluate the risk assessment rules 110 to assess whether there is a security risk associated with that user.

In another implementation, the computing device 104 may determine 204 the security risk associated with the login user upon receiving updated risk assessment rules 110 (e.g., from a management server 102) that indicate a new vulnerability associated with the computing device 104. For example, if a software application exploit is identified by an administrator, the administrator may send new risk assessment rules 110 to the computing device 104 to "flag" the vulnerable software application (i.e., associate the software application with the exploit). The computing device 104 may evaluate the risk assessment rules 110, in response to receiving the updated risk assessment rules 110, to assess whether the login user has access to the vulnerable software application.

The computing device 104 may apply, at 206, a privilege mitigation measure 114 based on the security risk associated with the login user. For example, when the security risk is detected, the computing device 104 may prevent the user from accessing one or more resources of the computing device 104, to protect the computing device 104.

The computing device 104 may implement one or more of the privilege mitigation measures 114 indicated in the risk assessment rules 110. Examples of the privilege mitigation measures 114 include reducing a user privilege level of the login user, preventing application installation and/or use on the computing device 104 by the login user until a vulnerable application is updated, preventing access by the login user to sensitive files, disabling network access, prompting the login user (e.g., via a GUI of the computing device 104) to take action to resolve a security risk, disabling the computing device 104, and/or repairing one or more user settings associated with the login user that are out of compliance with a group policy. Other privilege mitigation measures 114, alternative or in addition to those listed herein, may also be applied.

Figure 3:
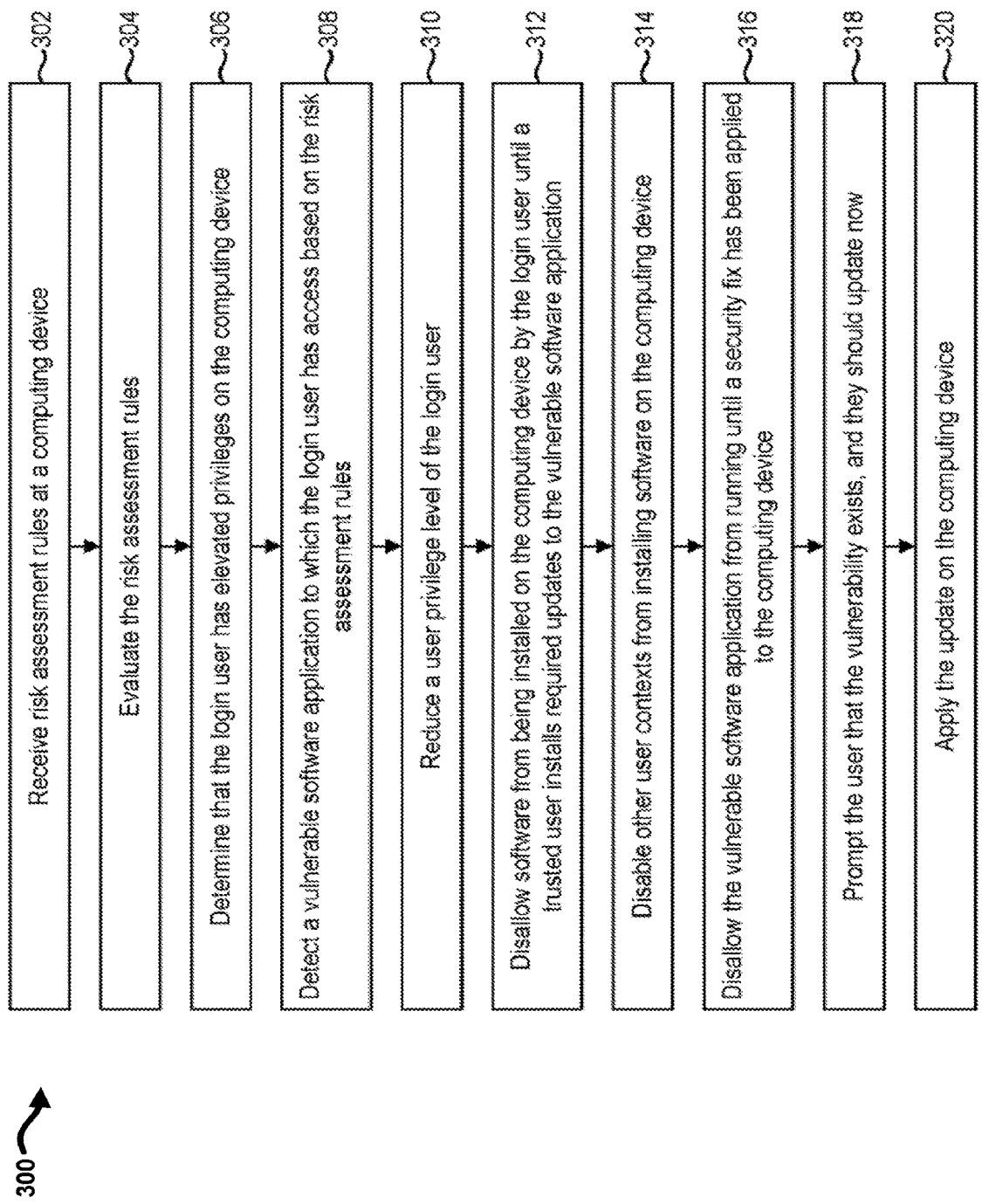
FIG. 3 is a flow diagram illustrating a method for context-based privilege mitigation including the detection of a vulnerable software application, according to another embodiment.

FIG. 3 is a flow diagram illustrating a method 300 for context-based privilege mitigation including the detection of a vulnerable software application, according to another embodiment. The method 300 may be implemented by a computing device (e.g., computing device 104 of FIG. IA) and/or by a computing device in communication with a management server (e.g., management server 102 of FIG.

1A). As shown in FIG. 3, the computing device 104 may receive, at 302, risk assessment rules 110 from a management server 102. This can be accomplished, for example, as described in connection with FIG. 2. Once the computing device 104 has received the risk assessment rules 110, the computing device 104 may or may not maintain communication with the management server 102. The risk assessment rules 110 may indicate that a software application of the computing device 104 is vulnerable to an exploit. For example, a vulnerability may cause application behavioral changes. In some instances, the vulnerability may be a zero-day exploit or other exploit that allows an attacker to gain the rights and privileges of the login user.

The computing device 104 may evaluate, at 304, the risk assessment rules 110. For example, the risk assessment rules 110 may provide risk criteria 112 associated with a security risk. An agent 116 on the computing device 104 may obtain and evaluate information on the computing device 104 that is relevant to the risk criteria 112 (e.g., an indication of one or more software applications installed on the computing device 104, a version of the one or more software applications, an identifier of the login user, a network type, etc.). For example, the agent 116 may evaluate user information 122 (e.g., login user privileges) and application information 126. The evaluation may occur at, and/or be triggered by, a user login or upon receiving updated risk assessment rules 110. The computing device 104 may then determine, at 306, that the login user has elevated privileges (as compared with one or more other authorized users of the computing device 104) on the computing device 104. For example, the login user may be an administrator or other user that has more access or rights on the computing device 104 and/or network 100 than other users.

The computing device 104 may detect, at 308, a vulnerable software application to which the login user has access. For example, the computing device 104 may identify the software application that was "flagged" by the risk assessment rules 110. The computing device 104 may also determine that a patch has not been applied to the software application, and that the software application is therefore vulnerable to an exploit. The computing device 104 may also determine that the login user has access to the vulnerable software application.

After the computing device 104 has determined that the user has elevated privileges as well as access to a vulnerable software application (notwithstanding that the vulnerability may not currently be active on the computing device 104), the computing device 104 may implement one or more privilege mitigation measures 114 specified in the risk assessment rules 110. For example, the computing device 104 may reduce, at 310, a user privilege level of the login user (e.g., an administrator may lose administrative privileges).

The computing device 104 may also, at 312, apply a rule or setting that prevents software from being installed on the computing device 104 by the login user until desired updates to the vulnerable software application have been installed (e.g., by a trusted user). By preventing the login user from installing additional software, the computing device 104 may prevent an exploit from using the user's privileges to install malicious code on the computing device 104.

The computing device 104 may also, at 314, apply a rule or setting that prevents other users from installing software on the computing device 104. This may prevent an exploit from using the login user's credentials to install malicious code using another user's account.

The computing device 104 may also, at 316, apply a rule or setting that prevents the vulnerable software application from running until a security fix has been applied to the computing device 104. In other words, the computing device 104 may disable or block the vulnerable software application. For example, the computing device 104 may blacklist the vulnerable software application to prevent the vulnerable software application from running. The blacklist may be enforced until the computing device 104 determines that the software application has been updated to resolve the security risk.

The computing device 104 may prompt the user, at 318, that a vulnerability exists on the computing device 104 (e.g., by providing a message to the user via a GUI), and provide a request to the user that they update a relevant software application. For example, the computing device 104 may display a warning to the user that indicates that the software application has been identified as a security risk and that an update is needed.

In an implementation, the computing device 104 applies the update, at 320. The computing device 104 can apply the update automatically. For example, the agent 116 may invoke a patch management system, e.g., resident within the computing device 104 or in operable communication therewith, to perform the update. Alternatively, the computing device 104 can apply the update in response to a user input. For example, the login user may respond to the prompt of 318 by inputting an instruction (e.g., via the GUI) to apply the update.

The computing device 104 may enforce one privilege mitigation measure 114 or a combination of privilege mitigation measures 114 in response to the detection of the vulnerable software application. For example, for a user with a lower privilege level than other users, the computing device 104 may only provide an indication, at 318, to the user that a vulnerability exists on the computing device 104 and that a software update is needed, but the computing device 104 may allow the user to continue using the vulnerable software application. For a user with relatively higher privilege levels, however, the computing device 104 may additionally impose restrictions on the user's privilege levels (e.g., including disabling the vulnerable software application). As can be observed by this example, the systems and methods set forth herein provide for different levels of security based on the context of the security risk.

Figure 4:
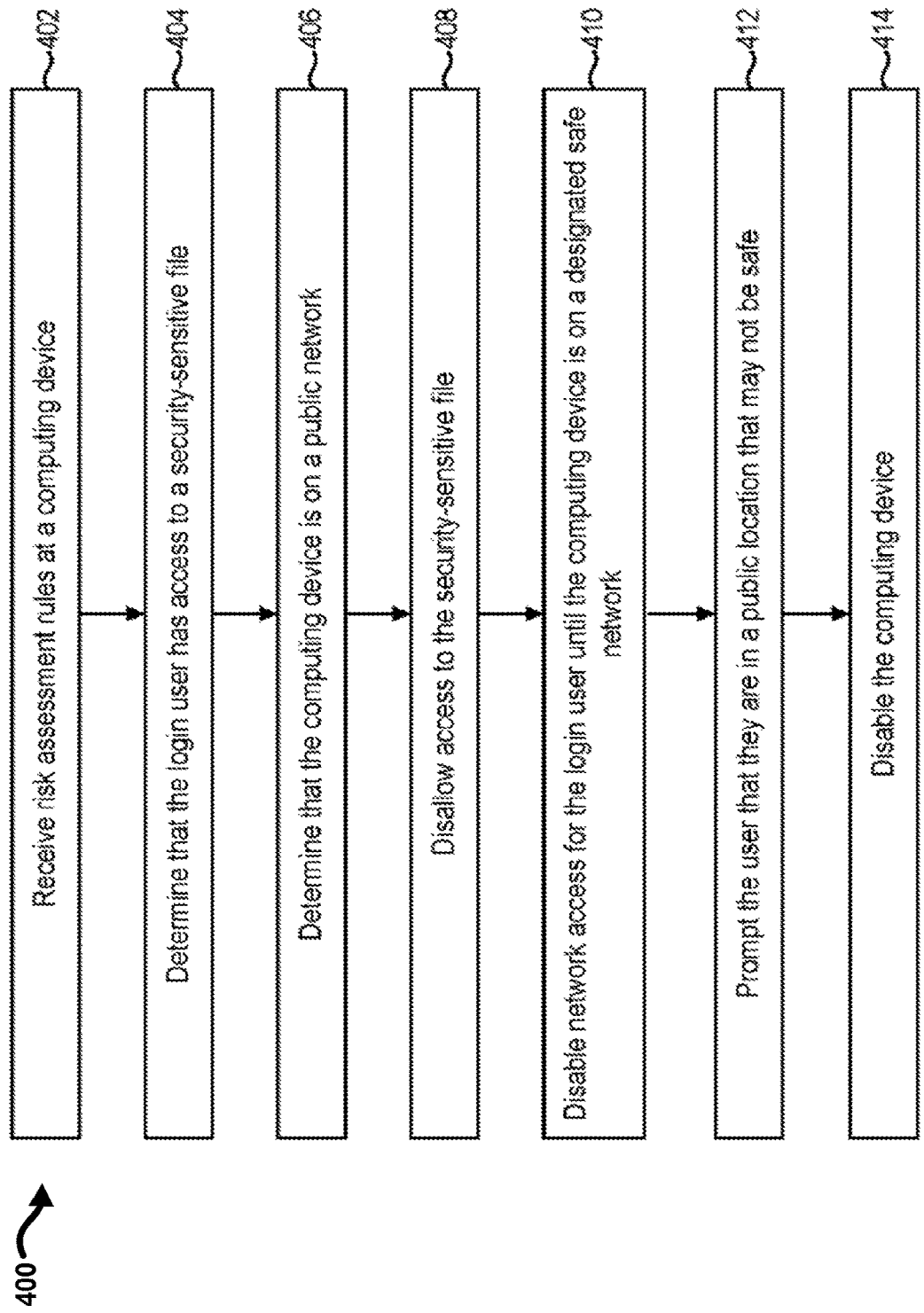
FIG. 4 is a flow diagram illustrating a method for context-based privilege mitigation including detecting that a computing device is on a public network, according to another embodiment.

FIG. 4 is a flow diagram illustrating a method 400 for context-based privilege mitigation including detecting that a computing device (e.g., computing device 104) is on a public network, according to another embodiment. The method 400 may be implemented by a computing device 104. As shown in FIG. 4, the computing device 104 receives, at 402, risk assessment rules 110 from a management server 102. This can be accomplished, for example, as described in connection with FIG. 2. After the computing device 104 has received the risk assessment rules 110 at 402, the computing device 104 may or may not maintain communication with the management server 102. The computing device 104 may determine, at 404, that the login user has access to a security-sensitive file. In such a case, the login user has access to privileged files that, for example, should be confidential. The computing device 104 may also determine that these security-sensitive files are accessible to the login user via the computing device 104.

The computing device 104 determines, at 406, that the computing device 104 is on a public network. For example, the login user may stop using his/her laptop after a period of time of being connected to a designated safe network, and resume using his/her laptop with a connection to a publicly-accessible network. The computing device 104 may detect this change in network type.

The computing device 104 may determine, based on the risk assessment rules 110, that a security risk exists when a user, having both an elevated privilege level (as compared with other users) and access to privileged files, is off-network. The computing device 104 may respond to this determination of the security risk by implementing one or more privilege mitigation measures 114. For example, the computing device 104 may, at 408, apply a rule or setting that prevents access by the login user to the security-sensitive file. In other words, files that are privileged and/or confidential would not be accessible by the login user via the computing device 104 (and/or via one or more other devices in network communication therewith). For example, the computing device 104 may blacklist security-sensitive files or software applications from access by the login user while the computing device 104 is off-network.

Alternatively or in addition, the computing device 104 may, at 410, apply a rule or setting that prevents network access for the login user until the computing device 104 is connected to a designated safe network 100. In some circumstances, the login user may not be able to access a secure network until they are at a predetermined geographic location that is covered by the secure network. In another implementation, the computing device 104 may disable network access (e.g., access to ports, web browsers, file transfer protocol (FTP) clients, etc.) while the computing device 104 is off-network, but permit the login user to continue to use the computing device 104 for other tasks.

At 412, the computing device 104 may provide a message to the login user (e.g., via a GUI) to alert them to the fact that they are in a public location that may not be safe. For example, the computing device 104 may display a text box warning the user that the current network connection may not be secure. The computing device 104 may also provide a message to the login user asking the login user to confirm that they want to open the security-sensitive file. This privilege mitigation measure 114 may be implemented, for example, when the security risk is deemed to be low. In some cases, the computing device 104 may be disabled, at 414. For example, the computing device 104 may apply a rule or setting that prevents the user from using resources of the computing device 104 until the computing device 104 is back on-network.

Figure 5:
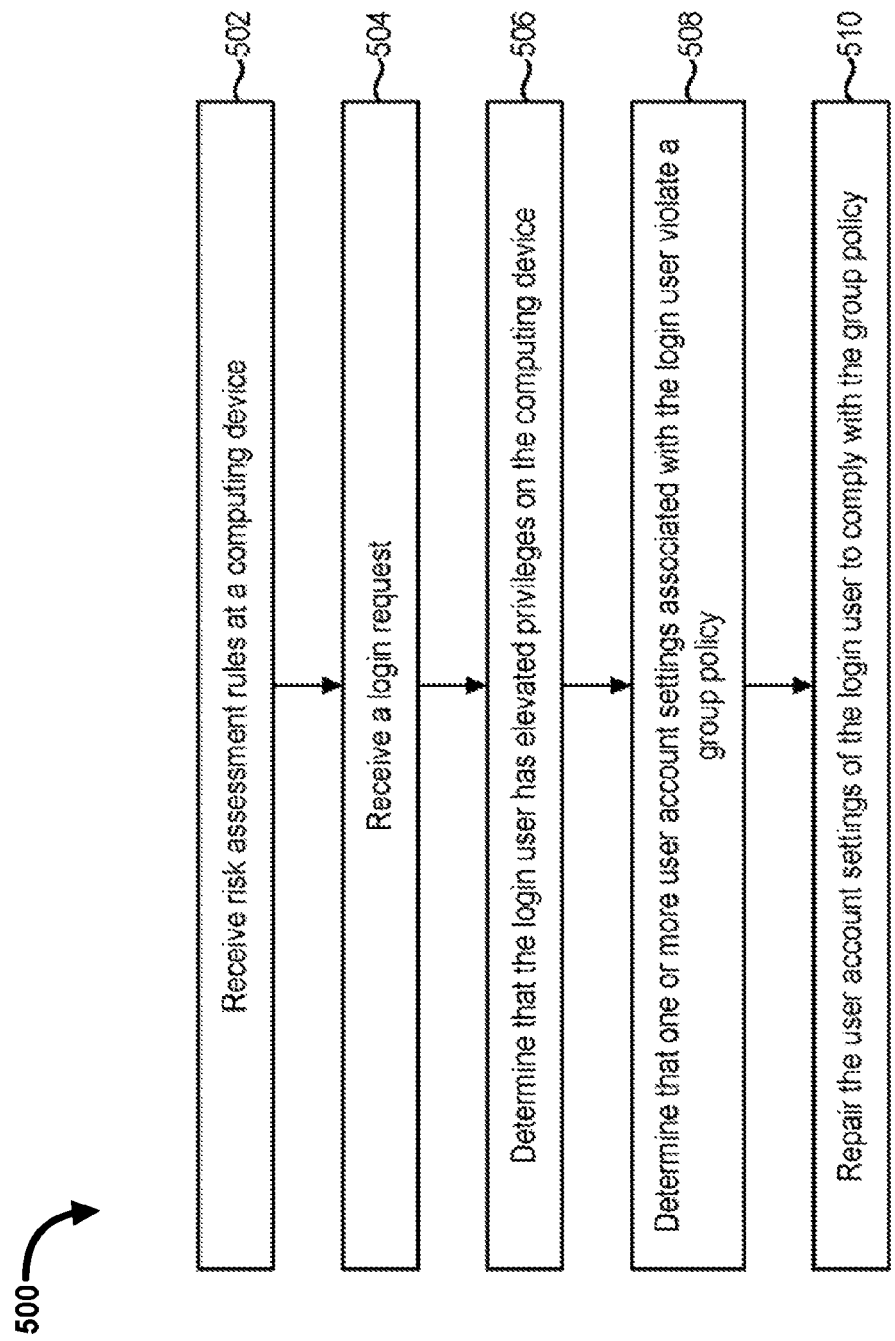
FIG. 5 is a flow diagram illustrating a method for context-based privilege mitigation including the detection of a group policy violation, according to another embodiment.

FIG. 5 is a flow diagram illustrating a method 500 for context-based privilege mitigation including the detection of a group policy violation, according to another embodiment. The method 500 may be implemented by a processor of a computing device (e.g., computing device 104 of FIG. IA). As shown in FIG. 5, the computing device 104 may receive, at 502, risk assessment rules 110 from a management server 102. This can be accomplished, for example, as described in connection with FIG. 2. After the computing device 104 has received the risk assessment rules 110 at 502, the computing device 104 may or may not maintain communication with the management server 102. In the example method 500 of FIG. 5, the risk assessment rules 110 include risk criteria 112 associated with violations of a GPO. In other words, user account settings that deviate from the GPO, and therefore may be considered a security risk, can be included in the risk criteria 112. Users having elevated privileges (e.g., administrators) as compared with other users, and that are determined to be in violation of the GPO may be considered an even higher security risk than would other users who similarly violate the GPO.

The computing device 104 receives a login request at 504. For example, a user may enter user credentials at the computing device 104, to gain access to the computing device 104. The computing device 104 may analyze relevant content (e.g., settings, policies, etc.) pertaining to the user and/or the applications and devices to which the user has access to determine an appropriate level of security for the login user. The computing device 104 determines, at 506, that the login user has elevated privileges on the computing device 104. For example, the login user may be an administrator or other user that has more access or rights on the computing device 104 and/or network 100 than other users. The computing device 104 determines, at 508, that one or more user account settings associated with the login user violates a GPO. For example, the computing device 104 may detect that an administrator has overridden a password enforcement policy. The computing device 104 may then, at 510, modify or "repair" the user account settings associated with the login user such that the user account settings comply with the GPO. For example, the computing device 104 may reset any password enforcement overrides so that the user account settings conform to the password enforcement policy of the GPO. The computing device 104 may enforce the risk assessment rules 110 either through exception-based awareness (e.g., by monitoring exceptions), or through strict rule application (e.g., by not allowing any exceptions) which would repair the group policy for administrators to ensure they are acting responsibly.

Figure 6:
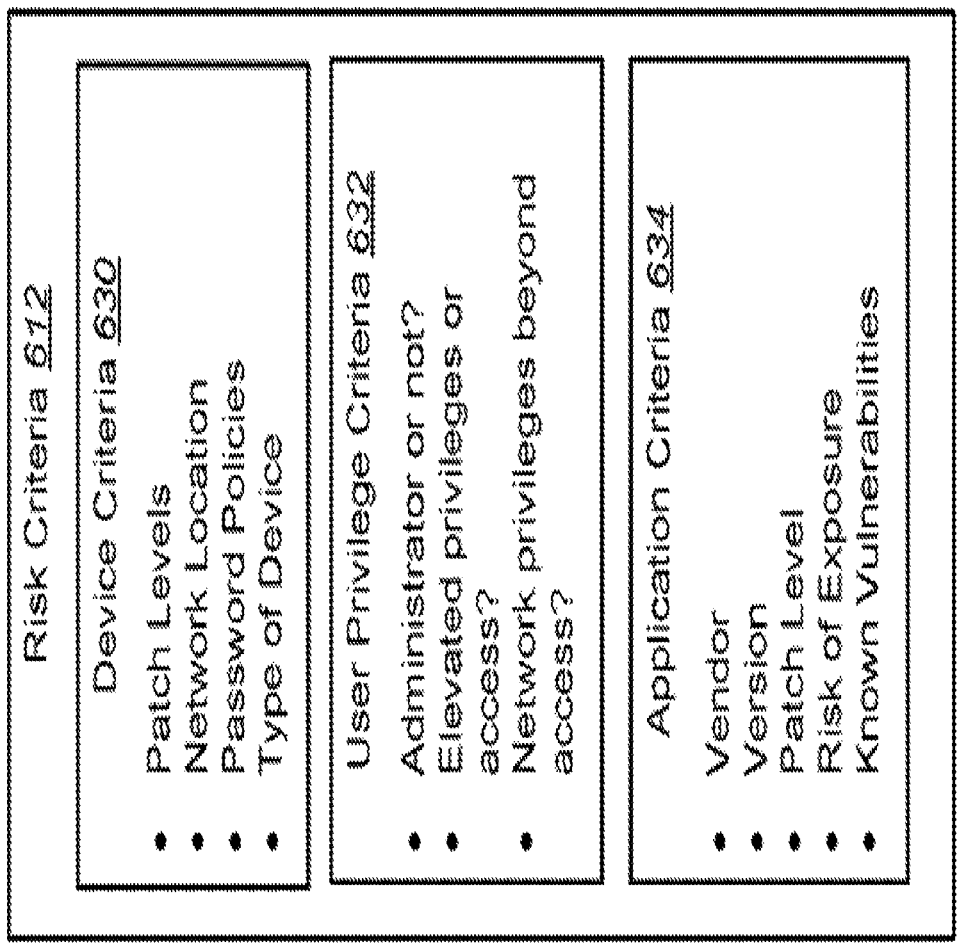
FIG. 6 is a block diagram illustrating various risk criteria that may be included in risk assessment rules, according to an embodiment.

FIG. 6 is a block diagram illustrating various risk criteria 612 that may be included in risk assessment rules 110, according to an embodiment. The risk criteria 612 indicate a security risk on a computing device 104 when one or more conditions are met. Included in the risk criteria 612 are device criteria 630, user privilege criteria 632, and application criteria 634. As shown in FIG. 6, the device criteria 630 can include parameters associated with the computing device 104 that indicate a security risk. These parameters can include, for example, patch levels of the computing device 104, an indication of network type or location (e.g., on a designated secure network or on a public network), password policies (e.g., GPO policies), an indication of the type of computing device 104, and/or configuration information such as one or more registry settings, one or more GPO settings, etc. The user privilege criteria 632 can include parameters associated with the login user that indicate a security risk. For example, the user privilege criteria 632 may include an indication of whether the login user is an administrator or not. The user privilege criteria 632 may also include, for example, an indication of privilege level or whether the login user has elevated privileges or access on the computing device 104 or network 100. The user privilege criteria 632 may further include, for example, an indication of whether the login user has network privileges beyond access.

The application criteria 634 can include various parameters associated with a software application on the computing device 104 that indicate security risk. The application criteria 634 may include, for example, an indication of the vendor of an application, the version of the application, the patch level of the application, an indication of the risk of exposure for that application, and/or an indication of one or more known vulnerabilities.

Figure 7:
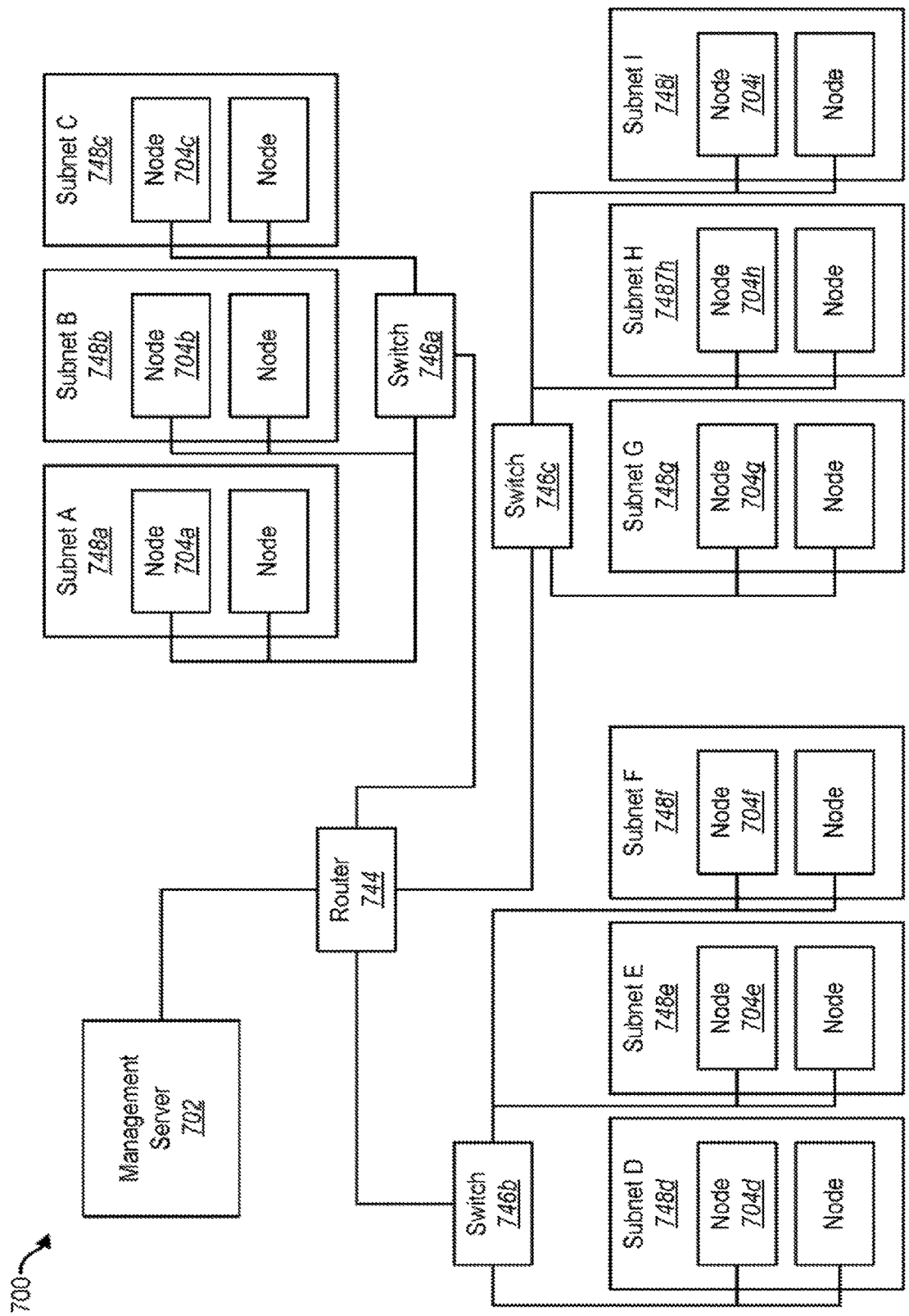
FIG. 7 is a block diagram that illustrates a networked system for context-based privilege mitigation, according to an embodiment.
Figure 8:
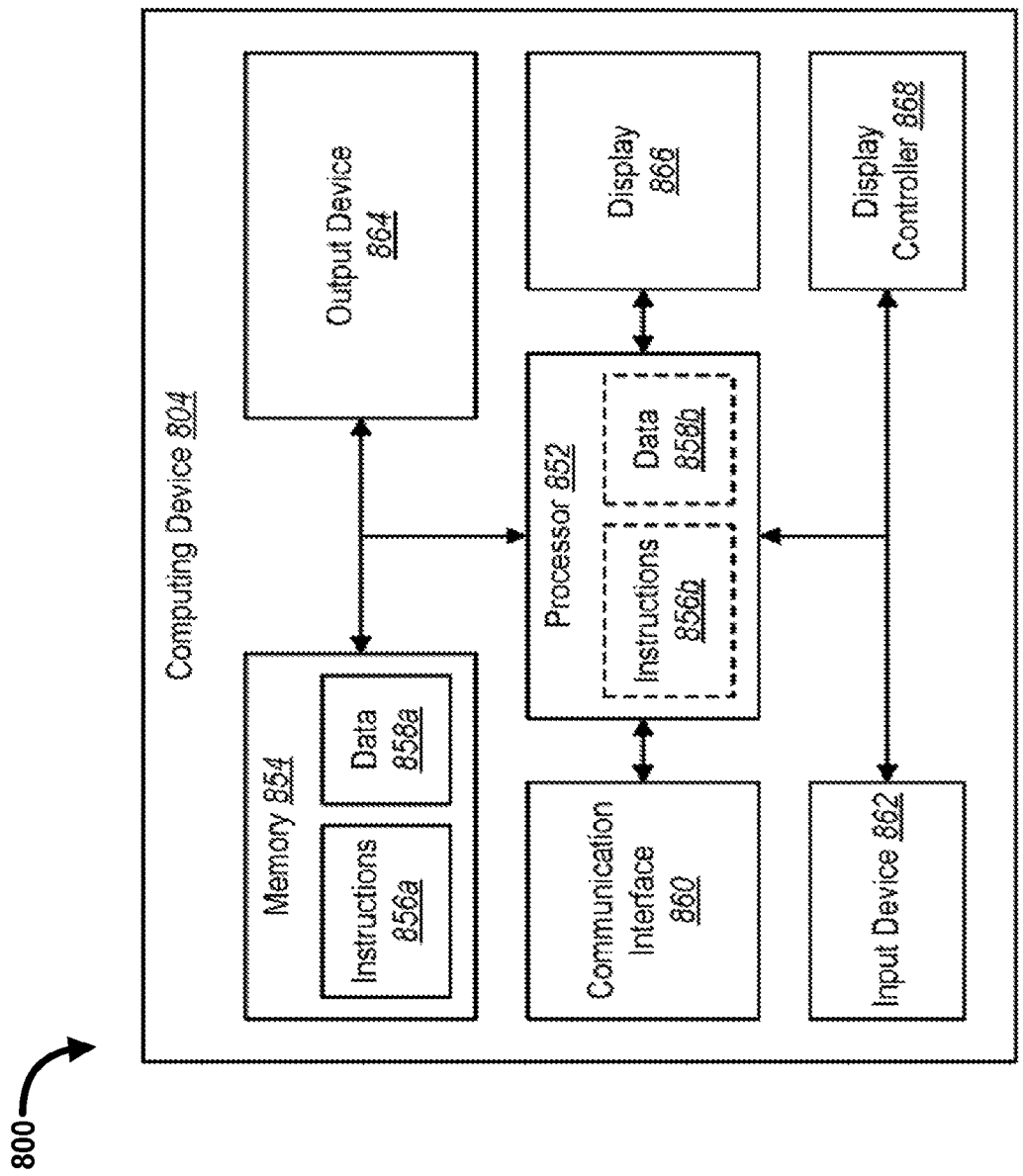
FIG. 8 illustrates a block diagram of a computing device for context-based privilege mitigation, according to an embodiment.

FIG. 7 is a block diagram that illustrates a networked system 700 for context-based privilege mitigation, according to an embodiment. As shown in FIG. 7, a management server 702 is connected to a router 744. The router 744 is connected to switches 746*a*, 746*b*, and 746*c*. The switch 746a is connected to several nodes 704a, 704b, 704c, etc., via their respective subnets 748a, 748b, and 748c. The switch 746b is connected to several nodes 704d, 704e, 704f, etc., via their respective subnets 748d, 748e, and 748f. The switch 746c is connected to several nodes 704g, 704h, and 704i, etc., via their respective subnets 748g, 748h and 748i. Subnet I 748i includes one or more nodes 704. Although FIG. 7 shows one router 744, and a limited number of switches 746, subnets 748, and nodes 704, many and varied numbers of routers 744, switches 746, subnets 748 and nodes 704 can be included in networks and/or systems used to implement context-based privilege mitigation. Management server 702 may be implemented in accordance with the management server 102 described in connection with FIG. 1A. Furthermore, the nodes 704 may be examples of one or more of the computing devices 104 described in connection with FIG. 1A. Although FIG. 7 shows management server 702 in communication with nodes 704, in some implementations one or more additional nodes (not shown) that are off-network can connect to the networked system 700 (e.g., via the cloud) instead of, or in addition to, the management server 702 (e.g., for purposes of sending/receiving risk assessment rules, reporting of enforcement activities, or any other functionality set forth herein as relating to a management server). FIG. 8 illustrates a computing device 804 for context-based privilege mitigation, according to an embodiment. The computing device 804 can be implemented as one or more of the management servers 102 or computing devices 104 described herein. As shown in FIG. 8, the computing device 804 includes a processor 852 and a memory 854. The memory 854 includes program instructions 856a and data 858a. The processor 852 controls the operation of the computing device 804 and may be, for example, a microprocessor, a microcontroller, a digital signal processor (DSP) or other device known in the art. The processor 852 is configured to perform logical and arithmetic operations based on program instructions 856b and/or data 858b received from the memory 854. The computing device 804 also includes one or more communication interfaces 860 for communicating with other electronic devices. The communication interfaces 860 can be based on wired communication technology, wireless communication technology or both. Examples of different types of communication interfaces 860 include a serial port, a parallel port, a Universal Serial Bus (USB), an Ethernet adapter, an IEEE bus interface, a small computer system interface (SCSI) bus interface, an infrared (IR) communication port, a Bluetooth® wireless communication adapter and so forth.

The computing device 804 also includes one or more input devices 862 and one or more output devices 864. Examples of input devices 862 include a keyboard, a mouse, a microphone, a remote control device, a button, a joystick, a trackball, a touchpad, a lightpen, etc. Examples of different kinds of output devices 864 include a speaker, a GUI, a printer, etc. One specific type of output device that may be included in a computer system is a display device 866. Display devices 866 used with configurations disclosed herein may utilize any suitable image projection technology, such as liquid crystal display (LCD), light-emitting diode (LED), gas plasma, electroluminescence, a cathode ray tube (CRT) or the like.

The computing device 804 also includes a display controller 868 for converting data stored in the memory 854 into text, graphics and/or moving images (as appropriate) for display on the display device 866. FIG. 8 illustrates one possible configuration of a computing device 804, and various other architectures and components can also be used.

Although shown and described above (e.g., as in FIG. 1A) to include a risk assessment rules generator 106 and an enforcement reporter 108, and to perform associated functions, in other embodiments the management server 102 can have additional functionality. For example, the management server 102 can include one or more of an agent 116, a risk evaluator 118, and a privilege mitigation enforcement module 120 and perform the associated functions as set forth herein.

In the above description, reference numbers have sometimes been used in connection with various terms. Where a term is used in connection with a reference number, this is meant to refer to a specific element that is shown in one or more of the figures. Where a term is used without a reference number, this is meant to refer generally to the term without limitation to any particular figures.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available non-transitory tangible medium that can be accessed by a computer or processor. By way of example, and not limitation, a computer-readable medium may comprise RAM, ROM, EEPROM, CD-ROM or other optical disk storage, magnetic disk storage or other magnetic storage devices or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server or other remote source using a coaxial cable, fiber optic cable, twisted pair, digital subscriber line (DSL) or wireless technologies such as infrared, radio, and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described methods. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

Although various embodiments have been described as having particular features and/or combinations of components, other embodiments are possible having a combination of any features and/or components from any of embodiments as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:
1. A method of context-based privilege mitigation, the method comprising:
  detecting a login event of a user of a computing device;
  receiving, by the computing device from a management server, a risk assessment rule that includes risk criteria and a plurality of privilege mitigation measures associated with the risk criteria, the risk assessment rule being communicated from the management server in response to the detection of the login event at the computing device, and the risk assessment rule indicates that a software application is vulnerable to an exploit;
  evaluating, by an agent on the computing device, information on the computing device that is relevant to the risk criteria;
  determining that the user has elevated privileges on the computing device;
  detecting, by the computing device, a vulnerable software application to which the user has access, the vulnerable software application being flagged by the risk assessment rule;
  identifying, by the computing device, a particular privilege mitigation measure of the plurality of privilege mitigation measures, wherein the particular privilege mitigation measure is mapped to the detected vulnerable software application; and applying, by the computing device, the particular privilege mitigation measure on the computing device, the particular privilege mitigation measure including an action that reduces a user privilege level of the user and prevents software from being used on the computing device by the user until a desired update to the vulnerable software application has been installed.

2. The method of claim 1, wherein the risk criteria include user privilege criteria, device criteria, and application criteria applicable to detection of the vulnerable software application.

3. The method of claim 2, wherein:
the device criteria include at least one of:
a patch level of the computing device,
a network type of the computing device, or
a password policy; and
the particular privilege mitigation measure is associated with the user privilege criteria.

4. The method of claim 1, wherein:
the risk criteria are a first risk criteria;
the login event is a first login event;
the vulnerable software application is a first security risk;
the action is a first action;
the particular privilege mitigation measure is a first privilege mitigation measure; and
the method further comprises:
receiving a second risk assessment rule including a second risk criteria and the plurality of privilege mitigation measures associated with the second risk criteria;
detecting a second login event of the user of the computing device;
determining a second security risk associated with the second login event based at least partially on the second risk criteria;
identifying a second privilege mitigation measure of the plurality of privilege mitigation measures, wherein the second privilege mitigation measure is mapped to the second security risk based on the second risk criteria and the second privilege mitigation measure includes a second action to decrease the second security risk that is different from the first action; and
applying the second privilege mitigation measure on the computing device.

5. The method of claim 1, further comprising receiving a second risk assessment rule in response to detection of a new vulnerability associated with the computing device.

6. The method of claim 4, wherein:
the second risk criteria include a network type of the computing device; and
the second privilege mitigation measure includes one or both of:
disabling network access for the user responsive to the network type of the computing device being a public network; and
sending an alert to the user responsive to the network type of the computing device being a public network that advises the user that the network is public.

7. The method of claim 4, wherein the applying the second privilege mitigation measure includes:
patching;
privilege management;
whitelisting;
blacklisting;
automatically repairing a group policy associated with the user;
causing installation of an update on the computing device; or
repairing user account settings associated with the user to comply with a group policy.

8. The method of claim 4, wherein:
the computer device is in operable communication with a network, and
the identification of the second security risk is performed in response to:
a detected change in the network; or
a detected group policy violation.

9. A non-transitory computer-readable medium having encoded therein programming code executable by one or more processors to perform or control performance of operations of context-based privilege mitigation, the operations comprising:
detecting a login event of a user of a computing device;
receiving, by the computing device from a management server, a risk assessment rule that includes risk criteria and a plurality of privilege mitigation measures associated with the risk criteria, the risk assessment rule being communicated from the management server in response to the detection of the login event at the computing device, and the risk assessment rule indicates that a software application is vulnerable to an exploit;
evaluating, by an agent on the computing device, information on the computing device that is relevant to the risk criteria;
determining that the user has elevated privileges on the computing device;
detecting, by the computing device, a vulnerable software application to which the user has access, the vulnerable software application being flagged by the risk assessment rule;
identifying, by the computing device, a particular privilege mitigation measure of the plurality of privilege mitigation measures, wherein the particular privilege mitigation measure is mapped to the detected vulnerable software application; and
applying, by the computing device, the particular privilege mitigation measure on the computing device, the particular privilege mitigation measure including an action that reduces a user privilege level of the user and prevents software from being used on the computing device by the user until a desired update to the vulnerable software application has been installed.

10. The non-transitory computer-readable medium of claim 9, wherein the risk criteria include user privilege criteria, device criteria, and application criteria applicable to detection of the vulnerable software application.

11. The non-transitory computer-readable medium of claim 10, wherein:
the device criteria include at least one of:
a patch level of the computing device,
a network type of the computing device, or
a password policy; and
the particular privilege mitigation measure is associated with the user privilege criteria.

12. The non-transitory computer-readable medium of claim 9, wherein:
the risk criteria are a first risk criteria;
the login event is a first login event;
the vulnerable software application is a first security risk;
the action is a first action;
the particular privilege mitigation measure is a first privilege mitigation measure; and
the operations further comprise:

receiving a second risk assessment rule including a second risk criteria and the plurality of privilege mitigation measures associated with the second risk criteria;

detecting a second login event of the user of the computing device;

determining a second security risk associated with the second login event based at least partially on the second risk criteria;

identifying a second privilege mitigation measure of the plurality of privilege mitigation measures, wherein the second privilege mitigation measure is mapped to the second security risk based on the second risk criteria and the second privilege mitigation measure includes a second action to decrease the second security risk that is different from the first action; and applying the second privilege mitigation measure on the computing device.

13. The non-transitory computer-readable medium of claim 9, wherein the operations further comprise receiving a second risk assessment rule in response to detection of a new vulnerability associated with the computing device.

14. The non-transitory computer-readable medium of claim 12, wherein:

the second risk criteria include a network type of the computing device; and the second privilege mitigation measure includes one or both of:

disabling network access for the user responsive to the network type of the computing device being a public network; and sending an alert to the user responsive to the network type of the computing device being a public network that advises the user that the network is public.

15. The non-transitory computer-readable medium of claim 12, wherein the applying the second privilege mitigation measure includes:

patching;

privilege management;

whitelisting;

blacklisting;

automatically repairing a group policy associated with the user;

causing installation of an update on the computing device; or repairing user account settings associated with the user to comply with a group policy.

16. The non-transitory computer-readable medium of claim 12, wherein:

the computer device is in operable communication with a network, and the identification of the second security risk is performed in response to:

a detected change in the network; or a detected group policy violation.

* * * * *